(12) United States Patent
Zhang et al.

(10) Patent No.: US 10,406,854 B2
(45) Date of Patent: Sep. 10, 2019

(54) OMNI WHEEL, MOTION DEVICE AND CONTROL METHOD THEREOF

(71) Applicant: BOE TECHNOLOGY GROUP CO., LTD., Beijing (CN)

(72) Inventors: Ying Zhang, Beijing (CN); Yifei Zhang, Beijing (CN); Kai Zhao, Beijing (CN); Yu Gu, Beijing (CN); Hongli Ding, Beijing (CN); Shuai Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 112 days.

(21) Appl. No.: 15/537,920

(22) PCT Filed: Sep. 9, 2016

(86) PCT No.: PCT/CN2016/098567
§ 371 (c)(1),
(2) Date: Jun. 20, 2017

(87) PCT Pub. No.: WO2017/121138
PCT Pub. Date: Jul. 20, 2017

(65) Prior Publication Data
US 2018/0050563 A1  Feb. 22, 2018

(30) Foreign Application Priority Data
Jan. 15, 2016 (CN) .......................... 2016 1 0028120

(51) Int. Cl.
*B60B 19/00* (2006.01)
*B60B 19/12* (2006.01)

(52) U.S. Cl.
CPC ............ *B60B 19/003* (2013.01); *B60B 19/12* (2013.01)

(58) Field of Classification Search
CPC .............................. B60B 19/003; B60B 19/12
(Continued)

(56) References Cited

U.S. PATENT DOCUMENTS

| 5,551,349 A | 9/1996 | Bodzin | |
|---|---|---|---|
| 2008/0018167 A1* | 1/2008 | Fuji | A61H 15/0092 301/5.23 |

(Continued)

FOREIGN PATENT DOCUMENTS

| CN | 101223039 A | 7/2008 |
|---|---|---|
| CN | 101357093 A | 2/2009 |

(Continued)

OTHER PUBLICATIONS

First Chinese Office Action dated Aug. 1, 2017.
International Search Report dated Nov. 30, 2016.

*Primary Examiner* — S. Joseph Morano
*Assistant Examiner* — Jean W Charleston
(74) *Attorney, Agent, or Firm* — Dilworth & Barrese, LLP; Michael J. Musella, Esq.

(57) ABSTRACT

An omni wheel, a motion device and a control method thereof are disclosed. The omni wheel includes a center wheel and a plurality of peripheral wheels distributed in a circle with respect to an axis of the center wheel; and a peripheral wheel brake component disposed on the centre wheel and configured to control a resistance of the peripheral wheels during a rotation of the peripheral wheels. The omni wheel solves the problem of low braking performance of the motion device by increasing the resistance of the peripheral wheels during rotation, and avoids any random rotation of the peripheral wheels.

14 Claims, 5 Drawing Sheets

(58) Field of Classification Search
USPC ........................................................ 301/5.23
See application file for complete search history.

(56) References Cited

U.S. PATENT DOCUMENTS

| | | |
|---|---|---|
| 2009/0065113 A1 | 3/2009 | Gunther |
| 2011/0272998 A1* | 11/2011 | Lee .................. B60B 19/12 |
| | | 301/5.23 |
| 2014/0232174 A1 | 8/2014 | Zdrahal et al. |
| 2015/0129327 A1* | 5/2015 | Yoshino ............ B60B 19/003 |
| | | 180/6.5 |
| 2015/0130260 A1* | 5/2015 | Bando ............... B60B 19/003 |
| | | 301/5.23 |
| 2015/0151572 A1* | 6/2015 | Parrott ............... B60B 19/12 |
| | | 301/5.23 |
| 2016/0375723 A1* | 12/2016 | Jochim ............ B60B 19/003 |
| | | 280/30 |

FOREIGN PATENT DOCUMENTS

| | | | |
|---|---|---|---|
| CN | 101803988 A | * | 8/2010 |
| CN | 101803988 A | | 8/2010 |
| CN | 102501726 A | | 6/2012 |
| CN | 105584290 A | | 5/2016 |
| CN | 205523386 U | | 8/2016 |
| KR | 100155193 B1 | | 7/1998 |
| KR | 1020100038861 A | | 4/2010 |

* cited by examiner

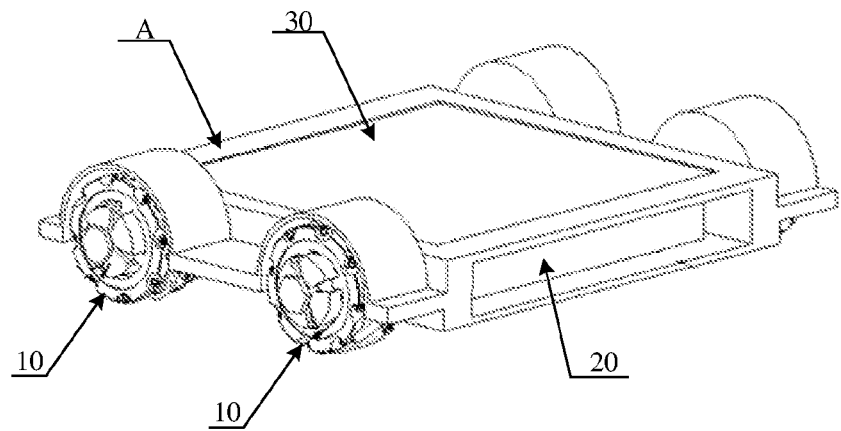
FIG. 3
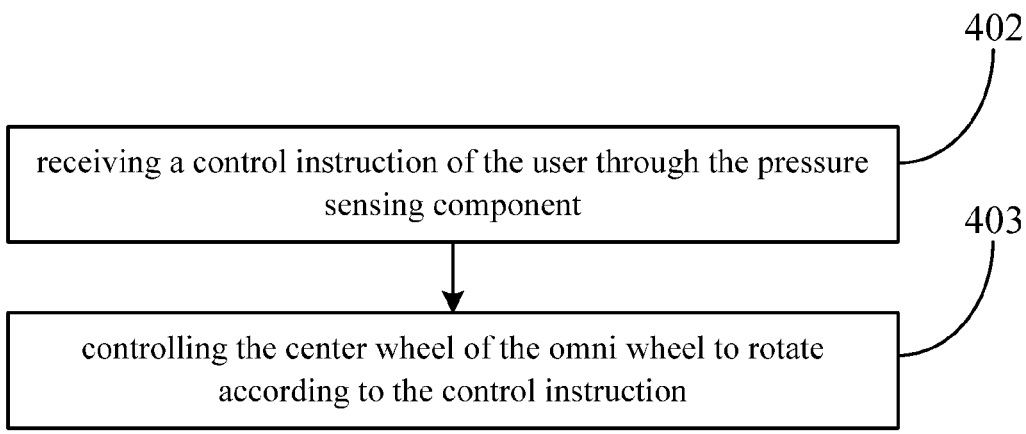
FIG. 4A
FIG. 4B

OMNI WHEEL, MOTION DEVICE AND CONTROL METHOD THEREOF

TECHNICAL FIELD

Embodiments of the present invention relate to an omni wheel, a motion device and a control method thereof.

BACKGROUND

An omni wheel includes a center wheel and a plurality of peripheral wheels distributed in a circular array with respect to an axis of the center wheel. The peripheral wheels can be autorotated (rotate along an axis thereof), and an angle (any angle except 90 DEG) is formed between the axis of the peripheral wheel and the center wheel.

A known motion device includes four omni wheels. The power generated by the four omni wheels can be finally combined into a composite force in any desired direction by control of rotation direction and rotation speed of each of the four omni wheels, so that the motion device can move towards the direction of the final composite force. The motion device can achieve a braking effect by increasing a resistance of the center wheel of the omni wheel during the rotation of the center wheel.

However, uncontrolled motion may occur due to other reasons in the braking process of the motion device, which results in poor braking performance.

SUMMARY

In order to solve the problem that uncontrolled motion may be occurred during braking process of motion device with poor braking performance in prior art, embodiments of the present invention provide an omni wheel, a motion device and a control method thereof.

Embodiments of the present invention adopt technical solutions as below.

According to one aspect, an omni wheel is provided, including a center wheel and a plurality of peripheral wheels distributed in a circle with respect to an axis of the center wheel; and a peripheral wheel brake component disposed on the centre wheel and configured to control a resistance of the peripheral wheels during a rotation of the peripheral wheels.

In an example, the peripheral wheel brake component includes a regulating stem and a plurality of expansion parts, wherein an axis of the regulating stem is coincident with the axis of the center wheel; and the expansion parts are uniformly distributed around the regulating stem and configured to, under a drive of the regulating stem, move towards the peripheral wheels and contact the peripheral wheels.

In an example, a tapered structure is disposed on the regulating stem; the regulating stem is movable along a lengthwise direction of the regulating stem and drive the plurality of expansion parts to move towards the peripheral wheels through the tapered structure; or a cam structure is disposed on the regulating stem; the cam structure is rotatable with respect to the center wheel and drive the plurality of expansion parts to move towards the peripheral wheels.

In an example, the center wheel includes two hubs having equal size and coincident axes, and the peripheral wheel brake component is disposed in the two hubs.

In an example, one of the two hubs is provided with a through hole; the through hole is provided with an axis and a plurality of compression springs disposed perpendicular to the axis of the hub; one end of any one of the plurality of compression springs abuts against an inner wall of the through hole, and the other end abuts against a first expansion part of the plurality of expansion parts; and the first expansion part is any one of the plurality of expansion parts.

In an example, the first expansion part includes a friction surface facing at least one of the plurality of peripheral wheels; and the other end of the any one of the plurality of compression springs abuts against the friction surface.

According to a second aspect, a motion device is provided, including a control component and at least four omni wheels according to the first aspect, the control component is configured to control the omni wheels.

In an example, the motion device further includes a pressure sensing component configured to acquire a control instruction of a user and transmit the control instruction to the control component.

In an example, the motion device further includes a power unit configured to supply power for the omni wheels.

According to a third aspect, a control method of the motion device according to the second aspect is provided, including: upon receiving a braking instruction, increasing a resistance of the center wheels of the omni wheels during a rotation of the center wheels, and increasing a resistance of the peripheral wheels during a rotation of the peripheral wheels through the peripheral wheel brake components on the omni wheels.

In an example, the motion device further includes a pressure sensing component; and the method further includes: receiving a control instruction of a user through the pressure sensing component; and controlling the center wheels of the omni wheels to rotate according to the control instruction.

The technical solutions provided by the embodiments of the present invention are advantageous in that: on the center wheel, by arrangement of the peripheral wheel brake component configured to control the resistance of the peripheral wheels disposed around the center wheel during the rotation of the peripheral wheels, the problem of low braking performance in case of uncontrolled motion occurred due to other reasons in the braking process of the motion device in the prior art is solved, and the effect of avoiding any random rotation of the peripheral wheels by increasing the resistance of the peripheral wheels during the rotation of the peripheral wheels through the peripheral wheel brake component is achieved.

BRIEF DESCRIPTION OF THE DRAWINGS

Hereafter, the embodiments of the present invention will be described in a more detailed way with reference to the accompanying drawings, so as make one person skilled in the art be able to understand the present invention more clearly, wherein:

FIG. 3 is a schematic structural view of a motion device provided by an embodiment of the present invention;

FIG. 4A is a flow chart of a control method of a motion device, provided by an embodiment of the present invention;

FIG. 4B is a flow chart of another control method of a motion device, provided by an embodiment of the present invention.

REFERENCE NUMERALS OF THE ACCOMPANYING DRAWINGS

10—omni wheel; 11—center wheel; 12—peripheral wheel; 13—peripheral wheel brake component; 131—regulating stem; 132—expansion part; k—first expansion part; 131a—cam structure; t—compression spring; c—friction surface; x—axis of center wheel; g—through hole; 20—control component; A—body of motion device; 30—pressure sensing component; 31, 32, 33 and 34—four areas of pressure sensing component; N—the direction that the user faces; 10a, 10b, 10c and 10d—four omni wheels.

DETAILED DESCRIPTION

Hereafter, the technical solutions in the embodiments of the present disclosure will be described in a clearly and fully understandable way in connection with the drawings in the embodiments of the present disclosure. It is obvious that the described embodiments are just a part but not all of the embodiments of the disclosure. Based on the described embodiments herein, one person skilled in the art can obtain other embodiment(s), without any inventive work, which should be within the scope of the disclosure.

Unless otherwise defined, the technical terminology or scientific terminology used herein should have the same meaning as commonly understood by one of ordinary skill in the art to which this invention belongs. Likewise, terms like "first," "second," etc., which are used in the description and the claims of the present application for invention, are not intended to indicate any sequence, amount or importance, but distinguish various components. The phrases "connect", "connected", etc., are not intended to define a physical connection or mechanical connection, but may include an electrical connection, directly or indirectly. "On," "under," "left," "right" or the like is only used to describe a relative positional relationship, and when the absolute position of a described object is changed, the relative positional relationship might also be changed accordingly.

Figure 1:
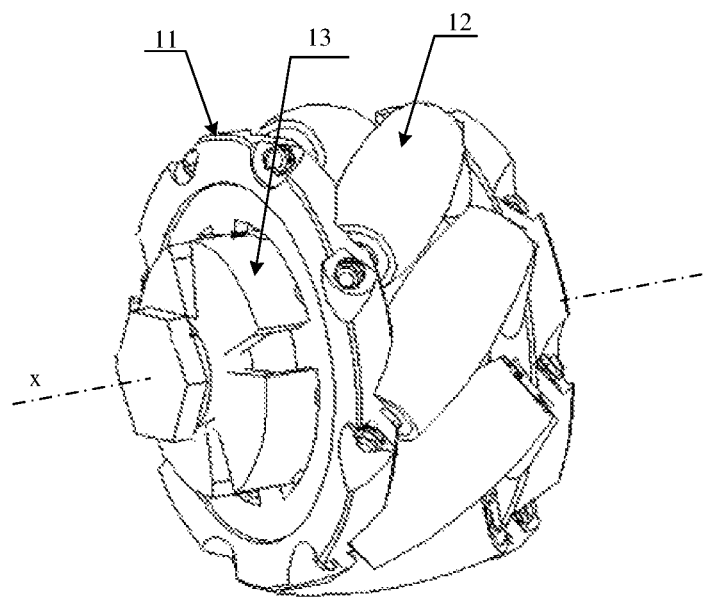
FIG. 1 is a schematic structural view of an omni wheel provided by an embodiment of the present invention.

FIG. 1 is a schematic structural view of an omni wheel provided by an embodiment of the present invention. As illustrated in FIG. 1, the omni wheel may include: a center wheel 11 and a plurality of peripheral wheels 12 arranged in a circle with respect to an axis x of the center wheel 11. The peripheral wheels 12 may be autorotated.

A peripheral wheel brake component 13 is disposed on the center wheel 11 and can control a resistance of the peripheral wheels 12 during rotation.

In summary, the omni wheel provided by the embodiment of the present invention solves the problem of low braking performance in case of uncontrolled motion occurred due to other reasons in the braking process of the motion device in the prior art by arrangement of the peripheral wheel brake component on the center wheel, which peripheral wheel brake component is capable of controlling the resistance of the peripheral wheel disposed around the center wheel during the rotation of the peripheral wheels, thereby avoiding any random rotation of the peripheral wheels by increasing the resistance of the peripheral wheels during rotation through the peripheral wheel brake component.

Figure 2A:
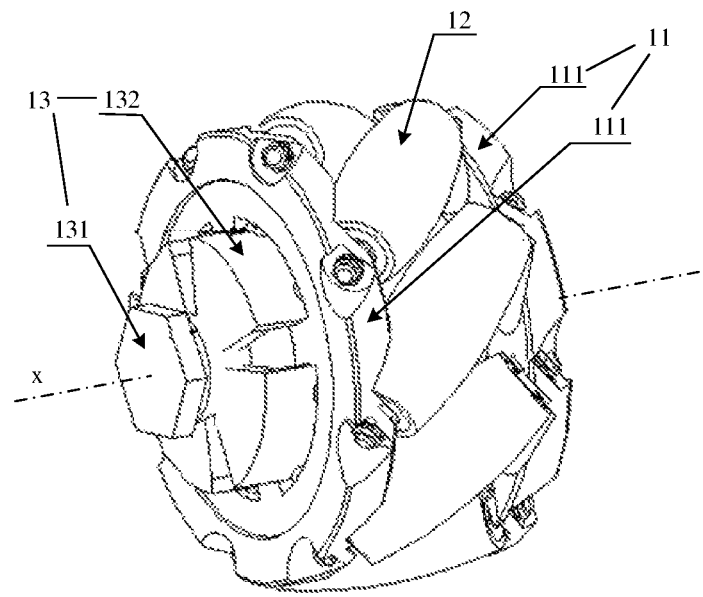
FIG. 2A is a schematic structural view of another omni wheel provided by an embodiment of the present invention.

As illustrated in FIG. 2A which is a schematic structural view of another omni wheel provided by the embodiment of the present invention. The omni wheel illustrated in FIG. 2A is provided with additional components on the basis of the omni wheel as illustrated in FIG. 1, for better performances.

As illustrated in FIG. 2A, optionally, the peripheral wheel brake component 13 includes a regulating stem 131 and a plurality of expansion parts 132; an axis of the regulating stem 131 is coincident with the axis of the center wheel 11, both indicated by x; the expansion parts 132 are uniformly distributed around the regulating stem 131 with respect to the axis x, and can, under the driving of the regulating stem 131, move towards the peripheral wheels 12 and make contact with the peripheral wheels 12. Illustratively, the omni wheel provided by the embodiment of the present invention is a Mecanum wheel.

The regulating stem in the omni wheel provided by the embodiment of the present invention may be implemented in various ways. Hereinafter, two example structures of the regulating stem will be described with reference to FIGS. 2B-2C, without limiting the embodiments of the present invention thereto.

Figure 2B:
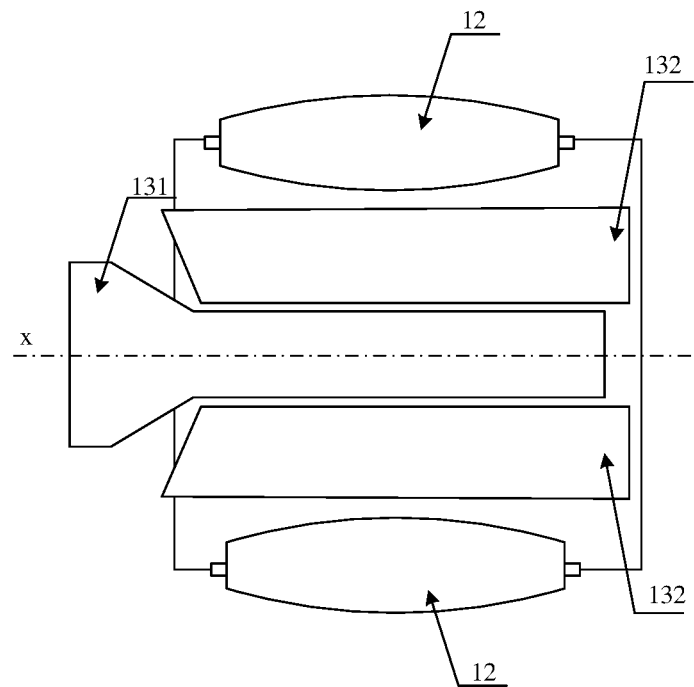
FIG. 2B is a schematic structural view of a regulating stem in the omni wheel provided by the embodiment as illustrated in FIG. 2A.

The first structure is as illustrated in FIG. 2B which is a schematic sectional view of a plane on which the axis x of the omni wheel as illustrated in FIG. 2A is located: a tapered structure, for instance, a tapered end portion as illustrated in FIG. 2B, is disposed on the regulating stem 131, and the regulating stem 131 can be movable along the lengthwise direction of the regulating stem 131 (the lengthwise direction may be the lengthwise direction of the axis x of the regulating stem 131) and drive the plurality of expansion parts 132 to move towards the peripheral wheels 12 through the tapered structure. It should be noted that FIG. 2B illustrates the case where only a portion of the body of the regulating stem 131 is tapered, but in other embodiments the entire body of the regulating stem 131 may be tapered, without particularly limited herein. The regulating stem 131 may also be provided with locking threads which may be engaged with other components on the center wheel so that the regulating stem 131 may be locked by the threads after the regulating stem 131 drives the expansion parts 132 to move towards the peripheral wheels 12 and contact the peripheral wheels 12.

Figure 2C:
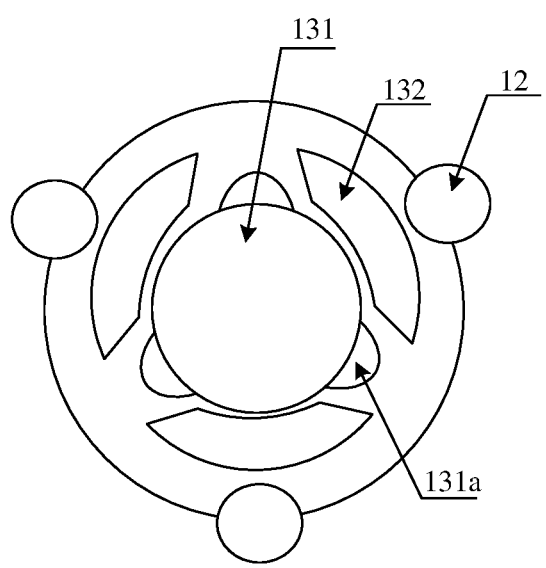
FIG. 2C is a schematic structural view of another regulating stem in the omni wheel provided by the embodiment as illustrated in FIG. 2B.

The second structure is as illustrated in FIG. 2C which is a schematic sectional view of a plane perpendicular to the axis x of the omni wheel as illustrated in FIG. 2A: a cam structure 131a is disposed on the regulating stem 131 and can, for instance, be rotated with respect to the axis x so as to drive the plurality of expansion parts 132 to move towards the peripheral wheels 12. For instance, the cam structure 131a may be autorotated (for instance, through a drive unit), or the cam structure 131a may be rotated along with the regulating stem 131.

It should be noted that the regulating stem 131 may have any other structures capable of pushing the expansion parts towards the peripheral wheels, without particularly limited in the embodiments of the present invention.

Optionally, in the embodiment as illustrated in FIG. 2A, the center wheel 11 includes two hubs 111 having equal size and coincident axes; and the peripheral wheel brake component 13 is disposed in the two hubs 111.

Figure 2D:
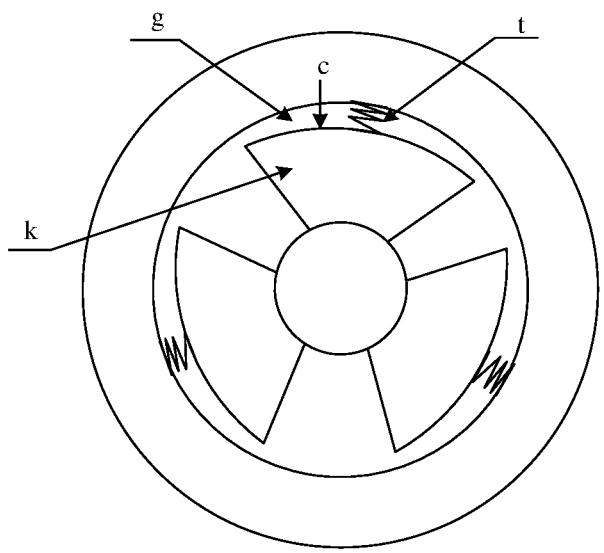
FIG. 2D is a schematic structural view of the omni wheel provided by the embodiment as illustrated in FIG. 2B.

Optionally, in the embodiment as illustrated in FIG. 2D, a through hole g is formed in one of the hubs 111, and the through hole g is provided with a plurality of compression springs t each having an axis perpendicular to the axis of the hub 111; one end of any of the compression springs t abuts against an inner wall of the through hole g, and the other end abuts against a first expansion part k in the plurality of expansion parts; the first expansion part k is any expansion part in the plurality of expansion parts. The first expansion part k includes a friction surface facing at least one of the peripheral wheels (not illustrated in FIG. 2D); the other end of any of the compression spring abuts against the friction surface; and the friction surface may be made from flexible materials such as rubber so as to improve a controlling effect of the friction surface with respect to the resistance of the peripheral wheels during rotation of the peripheral wheels. Due to the compression spring t, the friction surface may not contact the peripheral wheel during the normal rotation of the omni wheel (the rotation of the peripheral wheel is not necessarily required when the omni wheel is in normal rotation), so as to avoid the influence of the expansion parts on the normal rotation of the peripheral wheels.

It should be noted that: optionally, the other hub in the two hubs 111 that is not provided with the through hole may be provided with a dead hole; and the expansion parts may abut against the dead hole so as to ensure the stability of the expansion parts during the movement of the expansion parts towards the peripheral wheels.

Figure 2E:
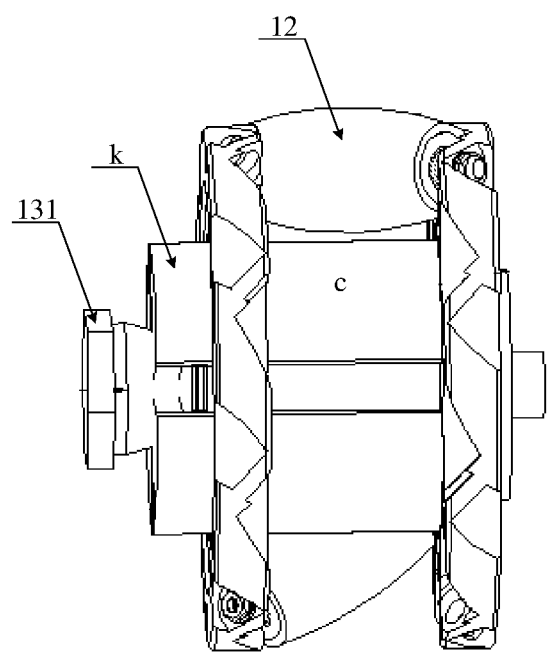
FIG. 2E is a right view of the omni wheel as illustrated in FIG. 2D.

As illustrated in FIG. 2E which is a right view of the omni wheel as illustrated in FIG. 2D, 131 refers to the regulating stem; k refers to the first expansion part; c refers to the friction surface on the first expansion part k; and 12 refers to the peripheral wheel. For clear illustration of the friction surface c, part of the peripheral wheels are omitted in FIG. 2E.

It should be also noted that the omni wheel provided by the embodiment of the present invention adjusts the friction force between the expansion parts and the peripheral wheels by means of the regulating stem provided with the tapered structure, so as to control the resistance of the peripheral wheels during rotation, thereby avoiding any random rotation of the peripheral wheels.

It should be also noted that the omni wheel provided by the embodiment of the present invention adjusts the friction force between the expansion parts and the peripheral wheels by means of the regulating stem provided with the cam structure, so as to control the resistance of the peripheral wheels during rotation of the peripheral wheels, thereby avoiding any random rotation of the peripheral wheels.

It should be also noted that the omni wheel provided by the embodiment of the present invention prevents the expansion parts from affecting the free rotation of the peripheral wheels during the normal rotation of the omni wheel by arrangement of the compression springs between the expansion parts and the hubs.

In summary, the omni wheel provided by the embodiment of the present invention solves the problem of low braking performance in case of uncontrolled motion occurred due to other reasons in the braking process of the motion device in the prior art by arrangement of the peripheral wheel brake component on the center wheel, and achieves the effect of avoiding any random rotation of the peripheral wheels by increasing the resistance of the peripheral wheels during the rotation thereof through the peripheral wheel brake component.

FIG. 3 is a schematic structural view of a motion device provided by an embodiment of the present invention. The motion device includes a control component 20 and at least four omni wheels 10 provided by any embodiment as illustrated in FIGS. 1 to 2E, that is to say, the omni wheel 10 includes a center wheel and a plurality of peripheral wheels arranged in a circle with respect to an axis of the center wheel, and a peripheral wheel brake component is disposed on the center wheel and configured to control the resistance of the peripheral wheels during rotation of the peripheral wheels. The control component 20 is configured to control the omni wheels 10.

The motion device may include a body A, and the components of the motion device may be disposed in the body A.

Optionally, the motion device may further include a pressure sensing component 30. The pressure sensing component 30 is configured to acquire a control instruction of a user and transmit the control instruction to the control component. The pressure sensing component 30 may be disposed over the body A so as to facilitate the acquisition of the control instruction of the user.

The motion device provided by the embodiment of the present invention may be a balance car. The balance car may be applied in tallying occasions such as shopping malls and supermarkets and inspection occasions such as hotels and shops.

Optionally, the motion device may further include a power unit (not illustrated in FIG. 3) which is configured to supply power for the omni wheels 10. The power unit may be disposed in the body A, for instance, below the pressure sensing component 30. Illustratively, the power unit may include batteries and an electric motor; the batteries are configured to provide power for the electric motor; and the electric motor may be connected with the omni wheels so as to drive the omni wheels or brake the omni wheels.

It should be noted that FIG. 3 illustrates the case where the number of the omni wheels 10 is four, and the positions of the four omni wheels may correspond to four vertexes of a square. In addition, the number of the omni wheels in the motion device may also be more or less, without particularly limited in the embodiments of the present invention.

It should be also noted that the motion device provided by the embodiment of the present invention can be conveniently controlled by a user for the arrangement of the pressure sensing component.

It should be also noted that the motion device provided by the embodiment of the present invention is self-movable through the power unit by arrangement of the power unit.

In summary, the motion device provided by the embodiment of the present invention solves the problem of low braking performance in case of uncontrolled motion occurred due to other reasons in the braking process of the motion device in the prior art by arrangement of the peripheral wheel brake component on the center wheel, so as to achieve the effect of avoiding any random rotation of the peripheral wheels by increasing the resistance of the peripheral wheels during the rotation thereof through the peripheral wheel brake component.

FIG. 4A is a flow chart of a control method of the motion device provided by an embodiment of the present invention. The method can control, for instance, the motion device as illustrated in FIG. 3. The method includes steps as below.

S401: upon receiving a braking instruction, increasing the resistance of the center wheel of the omni wheel during rotation of the center wheel, and increasing the resistance of the peripheral wheels during rotation of the peripheral wheels through the peripheral wheel brake component on the omni wheel.

Upon receiving the braking instruction specific to any of the omni wheels, the control component can increase the resistance of the center wheel of the omni wheel during the rotation of the center wheel, and increase the resistance of the peripheral wheels during the rotation of the peripheral wheels through the peripheral wheel brake component on the omni wheel; namely simultaneously braking the center wheel and the peripheral wheels of a specified omni wheel.

Illustratively, the center wheel may be braked by the electric motor, and the peripheral wheels may be braked by the peripheral wheel brake component. In addition, when the motion device is in an idle state, the control component may also lock both the center wheel and the peripheral wheels, so as to avoid the sliding of the motion device. The control component may also adjust the resistance of the peripheral wheels during the rotation of the peripheral wheels according to the type of the ground contacted by the motion device, so that the motion device can be adapted to different types of grounds.

In the prior art, the center wheel is usually braked by the electric motor, but in the process of braking the center wheel, if the entire motion device has a kinetic energy in a certain direction, the peripheral wheels may be rotated towards this direction, which may result in uncontrolled movement of the motion device and affect the braking effect of the motion device. This involves a certain risk when the motion device carries an operator or heavy cargoes. As a comparison, the control method of the motion device provided by the embodiment of the present invention avoids any random rotation of the peripheral wheels and hence improves the braking effect of the motion device.

Optionally, the motion device further includes a pressure sensing component. As illustrated in FIG. 4B, the method further includes steps S402 to S403 as below.

S402: receiving a control instruction of the user through the pressure sensing component.

When the user operates the motion device, the motion device may receive the control instruction of the user through the pressure sensing component. The pressure sensing component may be the pressure sensing component in the motion device as illustrated in FIG. 3A. In addition, the control instruction of the user may also be acquired by other means. Illustratively, the control instruction of the user may be received by a control terminal connected with the motion device.

S403: controlling the center wheel of the omni wheel to rotate according to the control instruction.

Upon acquiring the control instruction of the user, the motion device may control the center wheel of the omni wheel to rotate according to the control instruction. It should be noted that the control method as illustrated in FIG. 4A and the control method as illustrated in FIG. 4B may be two parallel control methods which respectively control the motion device in different cases.

Figure 4C:
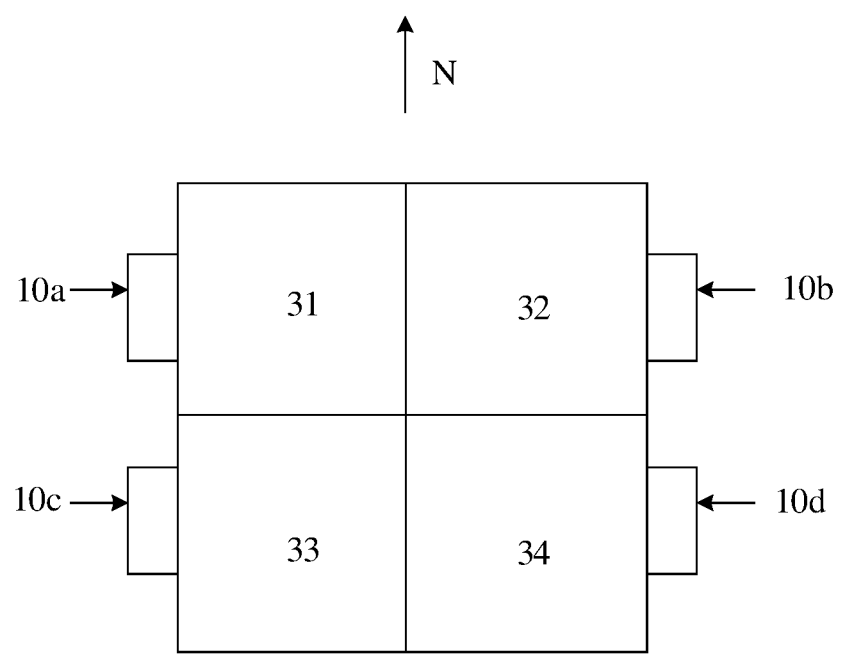
FIG. 4C is a top view of the motion device as illustrated in FIG. 3A.

Hereinafter the control means of the pressure sensing component 30 will be described by way of example. As illustrated in FIG. 4C which is a top view of the motion device as illustrated in FIG. 3A, when operating the motion device, the user may face the direction N, with feet on the pressure sensing component 30; a surface of the pressure sensing component that is contacted with the user is divided into four areas 31, 32, 33 and 34; when the user normally steps on the pressure sensing component 30 (with no intention of leaning to any of the areas), the pressure on each of the four areas of the pressure sensing component 30 is an initial value; subsequently, the user may change the respective pressure on the four areas of the pressure sensing component 30 by changing the center of gravity (CG) thereof; and the changes of the pressure on respective areas may correspond to different control instructions.

Illustratively, in the case where the front, rear, left and right with respect to the direction N to which user faces are all standard directions, by way of example, when the user leans forward, the pressure applied by the left foot to the pressure sensing component 30 is increased, namely the pressure on the areas 31 and 32 is increased while the pressure on the areas 33 and 34 is reduced, then the motion device will move forward, and all the four omni wheels of the motion device move forward; when the user leans to the left, the pressure applied by the left foot to the pressure sensing component 30 is increased while the pressure applied by the right foot to the pressure sensing component 30 is reduced, then the motion device will move to the left, the omni wheels 10*b*,10*c* turn forward while the omni wheels 10*a*, 10*d* turn backward; and when the pressure on the areas 33 and 32 is increased, the motion device may rotate, then the omni wheels 10*a*, 10*c* turn forward while the omni wheels 10*b*, 10*d* turn backward. It should be noted that when the control component controls the respective omni wheels, for a specific omni wheel that is not to rotate, the center wheel thereof may be locked by the electric motor, and the peripheral wheels thereof may be locked by the peripheral wheel brake component if required so as to avoid the influence on the motion device due to random rotation of the peripheral wheels.

It should be also noted that, the control method of the motion device provided by the embodiment of the present invention acquires the control instruction of the user through the pressure sensing component and controls the center wheel of the omni wheel to rotate according to the control instruction so as to conveniently control the motion device.

In summary, the control method of the motion device provided by the embodiment of the present invention solves the problem of low braking performance in case of uncontrolled motion occurred due to other reasons in the braking process of the motion device in the prior art by arrangement of the peripheral wheel brake component on the center wheel, and achieves the effect of avoiding any random rotation of the peripheral wheels by increasing the resistance of the peripheral wheels during the rotation of the peripheral wheels through the peripheral wheel brake component.

It should be understood by those skilled in the art that all or part of steps for implementing the above embodiments may be performed by hardware or performed by programs which instruct relevant hardware. The programs may be stored in a computer-readable storage medium. The storage medium may be read-only memory (ROM), disk, compact disk (CD) and the like.

Obviously, various modifications and deformations can be made to the present invention by those skilled in the art without departing from the spirit and scope of the present invention. Therefore, the present invention is intended to include the modifications and deformations fallen within the scope of the appended claims and equivalents thereof.

The present application claims the benefits of Chinese patent application No. 201610028120.1 filed with the SIPO on Jan. 15, 2016 under the title "Omni Wheel, Motion device and Control Method thereof", which is incorporated herein by reference as part of the application.

The invention claimed is:

1. An omni wheel, comprising a center wheel and a plurality of peripheral wheels distributed in a circle with respect to an axis of the center wheel; and a peripheral wheel brake component disposed on the center wheel and configured to control a resistance of the peripheral wheels during a rotation of the peripheral wheels, wherein the peripheral wheel brake component comprises a regulating stem and a plurality of expansion parts, an axis of the regulating stem is coincident with the axis of the center wheel, and the expansion parts are uniformly distributed around the regulating stem and configured to, under a drive of the regulating stem, move towards the peripheral wheels and contact the peripheral wheels.

2. The omni wheel according to claim 1, wherein a tapered structure is disposed on the regulating stem; the regulating stem is movable along a lengthwise direction of the regulating stern and drive the plurality of expansion parts to move towards the peripheral wheels through the tapered structure; or a cam structure is disposed on the regulating stern; the cam structure is rotatable with respect to the center wheel and drive the plurality of expansion parts to move towards the peripheral wheels.

3. The omni wheel according to claim 1, wherein the center wheel comprises two hubs having equal size and coincident axes, and the peripheral wheel brake component is disposed in the two hubs.

4. The omni wheel according to claim 3, wherein one of the two hubs is provided with a through hole; the through hole is provided with an axis and a plurality of compression springs disposed perpendicular to the axis of the hub;

one end of any one of the plurality of compression springs abuts against an inner wall of the through hole, and the other end abuts against a first expansion part of the plurality of expansion parts; and the first expansion part is any one of the plurality of expansion parts.

5. The omni wheel according to claim 4, wherein the first expansion part comprises a friction surface facing at least one of the plurality of peripheral wheels; and the other end of the any one of the plurality of compression springs abuts against the friction surface.

6. A motion device, comprising a control component and at least four omni wheels, wherein the control component is configured to control the omni wheels, and wherein each of the omni wheels comprises: a center wheel and a plurality of peripheral wheels distributed in a circle with respect to an axis of the center wheel; and a peripheral wheel brake component disposed on the center wheel and configured to control a resistance of the peripheral wheels during a rotation of the peripheral wheels, and wherein the peripheral wheel brake component comprises a regulating stem and a plurality of expansion parts, an axis of the regulating stem is coincident with the axis of the center wheel, and the expansion parts are uniformly distributed around the regulating stem and configured to, under a drive of the regulating stem, move towards the peripheral wheels and contact the peripheral wheels.

7. The motion device according to claim 6, further comprising: a pressure sensing component configured to acquire a control instruction of a user and transmit the control instruction to the control component.

8. The motion device according to claim 6, further comprising: a power unit configured to supply power for the omni wheels.

9. The motion device according to claim 6, wherein the center wheel comprises two hubs having equal size and coincident axes, and the peripheral wheel brake component is disposed in the two hubs.

10. The motion device according to claim 9, wherein one of the two hubs is provided with a through hole; the through hole is provided with an axis and a plurality of compression springs disposed perpendicular to the axis of the hub;

one end of any one of the plurality of compression springs abuts against an inner wall of the through hole, and the other end abuts against a first expansion part of the plurality of expansion parts; and the first expansion part is any one of the plurality of expansion parts.

11. The motion device according to claim 10, wherein the first expansion part comprises a friction surface facing at least one of the plurality of peripheral wheels; and the other end of the any one of the plurality of compression springs abuts against the friction surface.

12. A control method of a motion device:

the motion device comprises a control component and at least four omni wheels, wherein the control component is configured to control the omni wheels, and wherein each of the omni wheels comprises: a center wheel and a plurality of peripheral wheels distributed in a circle with respect to an axis of the center wheel; and a peripheral wheel brake component disposed on the center wheel and configured to control a resistance of the peripheral wheels during a rotation of the peripheral wheels, the control method comprises:

upon receiving a braking instruction, increasing a resistance of the center wheels of the omni wheels during a rotation of the center wheels, and increasing a resistance of the peripheral wheels during a rotation of the peripheral wheels through the peripheral wheel brake components on the omni wheels, and wherein the peripheral wheel brake component comprises a regulating stem and a plurality of expansion parts, an axis of the regulating stem is coincident with the axis of the center wheel, and the expansion parts are uniformly distributed around the regulating stem and configured to, under a drive of the regulating stem, move towards the peripheral wheels and contact the peripheral wheels.

13. The method according to claim 12, wherein the motion device further comprises a pressure sensing component; and the method further comprises:

receiving a control instruction of a user through the pressure sensing component; and controlling the center wheels of the omni wheels to rotate according to the control instruction.

14. The motion device according to claim 12, wherein a tapered structure is disposed on the regulating stem; the regulating stern is movable along a lengthwise direction of the regulating stem and drive the plurality of expansion parts to move towards the peripheral wheels through the tapered structure; or a cam structure is disposed on the regulating stern; the cam structure is rotatable with respect to the center wheel and drive the plurality of expansion parts to move towards the peripheral wheels.

* * * * *